July 2, 1935.  G. P. PHILLIPS  2,006,717

ARTIFICIAL TEETH

Filed May 18, 1934

INVENTOR:
George P. Phillips,
By his Attorney,

Patented July 2, 1935

2,006,717

UNITED STATES PATENT OFFICE 2,006,717

ARTIFICIAL TEETH

George P. Phillips, Belmont, Mass., assignor to The Dentists' Supply Company of New York, New York, N. Y., a corporation of New York Application May 18, 1934, Serial No. 726,226

12 Claims. (Cl. 32—8)

In making artificial teeth and fitting them to a patient's mouth, an important problem consists in producing the desired balance during different functional relationships of the teeth. Since the lower plate simply rests on the gums, it must be held in place during chewing against forces tending to displace it, by pressure of the upper teeth, often transmitted through portions of the food. This difficulty is greatly increased if the lower gums of the patient are in poor condition and the ridge on which the plate rests is relatively flat. A further difficulty is that the excessive pressure to which the supporting tissues are subjected during chewing produces a gradual deterioration of these tissues if they are not healthy, and this is very likely to be the condition in a high percentage of the cases in elderly patients and in patients with systemic diseases. The problem presented in these situations, therefore, is not only one of maintaining the desired balance, but also minimizing the pressure load on the supporting tissues.

To improve artificial dentures with a view to avoiding excessive pressure while still maintaining the desired balance and the necessary mascatory efficiency of artificial dentures, constitutes the chief object of this invention.

The nature of the invention will be readily understood from the following description when read in connection with the accompanying drawing, and the novel features will be particularly pointed out in the appended claims.

In general it may be stated that the present invention deals only with the posterior teeth and it proposes to maintain all the important parts of the natural teeth but to eliminate those parts which tend to produce an unbalanced condition in full dentures. In the newer artificial teeth there is no provision for maintaining either a forward or lateral balance. The esthetic requirements in full dentures invariably call for a normal overbite, but this condition cannot be maintained in teeth having no cusps. To produce such a balance and still maintain all of the essential anatomical features of posterior teeth, the buccal cusps of the upper teeth are, according to this invention, eliminated, the lingual cusps of the lower bicuspids, and the mesio-lingual cusps of the lower molars are likewise eliminated, and only portions of the disto-lingual cusps of the lower molars and of the palatal cusps of the upper molars are retained.

Figure 1:
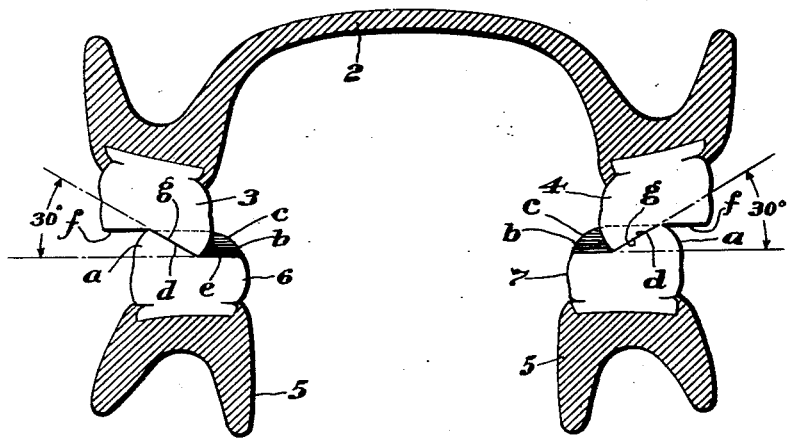
Figure 1 is a transverse, vertical, sectional view through a set of artificial teeth embodying features of this invention.
Figure 2:
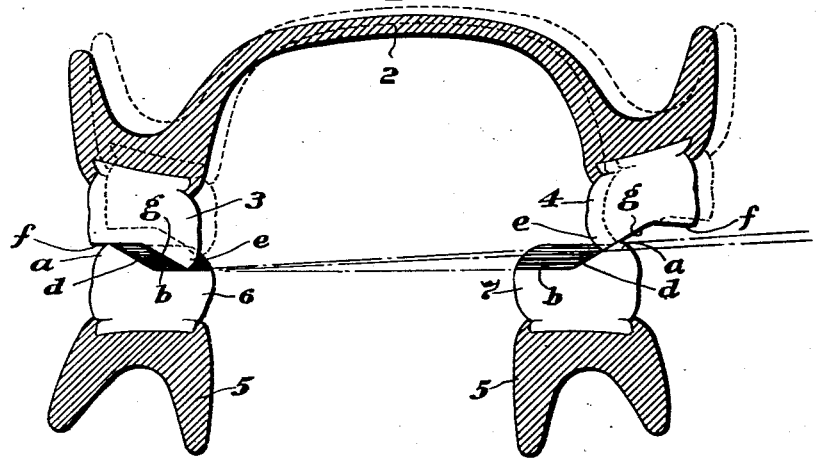
Fig. 2 is a view similar to Fig. 1 but showing the teeth in different relationships.

Referring to Figs. 1 and 2, the upper plate is shown at 2 carrying upper molars 3 and 4. The lower plate is indicated at 5 and is shown equipped with molars 6 and 7 opposed to the respective upper molars 3 and 4. The plane on which the sections of these two figures is taken is indicated approximately at A—A, Fig. 3. It will be seen from an inspection of the drawing that the lower molars are provided with buccal cusps $a$ but that the lingual cusps have been chiefly eliminated and in their place each molar is provided at the lingual side of the transverse groove of the tooth with a flat approximately horizontal surface $b$, the cusp projecting substantially above the plane of this surface. At the distal end of this surface a modified disto-lingual cusp $c$ is formed, the purpose of which will be more fully explained later. Preferably the flat surface $b$ extends approximately to the transverse groove of each tooth and at this point the said surface is joined by the inclined surface $d$ which connects it with the upper edges of the cusp $a$. These surfaces $d$ should lie in a fixed plane and such a plane may conveniently make an angle of approximately 30° with that of the plane of the surface $b$.

Figures 3, 3A:
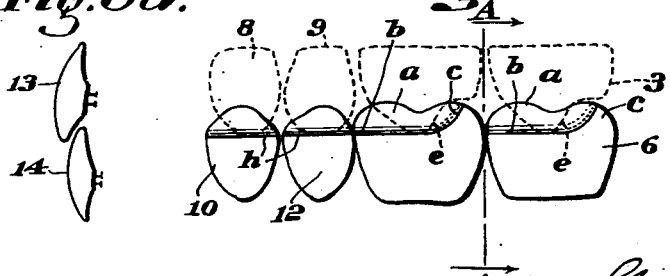
Fig. 3 is a vertical, sectional view inside the mouth and along a plane extending parallel to and inside the molars, illustrating diagrammatically certain relationships between the upper and lower teeth as provided by this invention.

The upper molars 3 and 4 have transverse occlusal surfaces which, in general, are complemental to those of the lower molars just described. They are provided with palatal cusps $e$ but are devoid of buccal cusps. In their stead these teeth are provided with flat faces $f$. Also, as shown in Fig. 3, the single palatal cusp $e$ is somewhat displaced from the usual location and is set slightly ahead of the adjacent rising surface of the disto-lingual cusp $c$ of the corresponding lower molar. Connecting the flat surface $f$ with the high point of the cusp $e$ of each upper molar is an inclined surface $g$ having the same angle as that of the incline $d$.

The upper bicuspids 8 and 9, Fig. 3, have the usual lingual cusps but no buccal cusps, while the lower bicuspids 10 and 12 have the usual buccal cusps but no lingual cusps. In place of the latter these teeth are provided with flat horizontal surfaces $h$ to engage the cusps of the upper bicuspids and the latter are provided with correspondingly flat horizontal surfaces to bear against the cusps of the lower bicuspids. All of the flat, horizontal surfaces of the lower posterior teeth lie in the same horizontal plane and those of the upper posterior teeth lie in a higher horizontal plane.

With this arrangement it will be evident from an inspection of the drawing that when the teeth are in a laterally centered relationship, as shown in Fig. 1, a balance both forwardly and laterally is established. In chewing, the lower jaw moves laterally, and the inclined surfaces d and g of the molars at one side of the mouth slide over each other but remain in contact, as shown in Fig. 2, while these corresponding surfaces separate laterally at the opposite side, but the cusps of each tooth ride on the flat surface of the other. If this movement is continued still further so that the point of the cusp e rides up on the point of the cusp a, as shown at the right of Fig. 2, then the molars 3 and 6 may separate, as indicated at the left of said figure. Such a movement will practically never occur, however, except in chewing, and when there is food between the molars 3 and 6. In that event, the lateral and closing movement natural to chewing will bring the inclined surfaces d and g of the molars 3 and 6 toward each other, thus crushing the food between these teeth. Consequently, even in this condition the balance is maintained. The grinding or occlusal surfaces of the corresponding upper and lower molars are made of such extent as to keep them always in overlapping relationship in any closed position. Presumably, the width of the inclined surfaces g and d is at least as great as that of the horizontal surfaces b and f in order to maintain a tooth balance and also to maintain a tooth and food balance. This is clearly shown by comparison of the solid line positions in Figs. 1 and 2, with the dotted line position of Fig. 2. Another way of stating it would be to say that the buccal inclines of the teeth 6 and 7, and the palatal inclines of the teeth 3 and 4 are each of a length not less than the horizontal occlusal surface of any tooth of course, including the cusp inclines as well as the horizontal portions. In all of these positions the load pressure on the tissues is reduced.

While the angle of the inclined surfaces d and g is preferably made very substantial, nevertheless the total rise of one tooth on its opposing tooth is relatively small, as will be evident from an inspection of Fig. 2.

Fig. 3 illustrates approximately the relationship of the posterior teeth at one side of the mouth in a position of normal overbite, as evidenced by the position of the upper and lower incisors 13 and 14. As above stated, the palatal cusps e of the upper molars normally ride on the flat faces b of the lower molars. By positioning the cusp e ahead of the rising surface of the disto-lingual cusp c by a distance of between one and two millimeters, the balance may be maintained during the protrusive and retrusive movement of the lower jaw. Also, this relationship allows for the inevitable migration of the lower jaw during function as resorption progresses.

The invention thus provides both a novel tooth structure and a novel form of denture in which balance may be continuously maintained in practically all functional relationships of the teeth.

Having thus described my invention, what I desire to claim as new is:

1. A set of artificial teeth in which certain of the lower posterior teeth are substantially devoid of lingual cusps, having substantially horizontal occlusal surfaces in lieu thereof and provided with buccal cusps inclining laterally from said surfaces, and the upper posterior teeth of which are substantially devoid of buccal cusps, having substantially horizontal occlusal surfaces in lieu thereof, and provided with palatal cusps inclining laterally from said surfaces.

2. A set of artificial teeth in which certain of the lower posterior teeth are substantially devoid of lingual cusps, having substantially horizontal occlusal surfaces in lieu thereof and provided with buccal cusps inclining laterally from said surfaces, and the upper posterior teeth of which are substantially devoid of buccal cusps, having substantially horizontal occlusal surfaces in lieu thereof, and provided with palatal cusps inclining laterally from said surfaces, the length of the lateral inclination of the cusps on the respective teeth being at least half of the width of the total occlusal surfaces of such teeth.

3. A set of artificial teeth in which the lower posterior teeth are provided with buccal cusps, but are substantially devoid of lingual cusps, and the upper posterior teeth are provided with palatal cusps and are substantially devoid of buccal cusps, and in which the length of the lateral incline of each of said provided cusps is at least 50% of the width of the occlusal surface of its respective tooth.

4. A set of artificial teeth in which the lower posterior teeth are provided with buccal cusps, but are substantially devoid of lingual cusps, and the upper posterior teeth are provided with palatal cusps and are substantially devoid of buccal cusps, and in which the length of the lateral incline of each of the provided buccal cusps is at least 50% of the width of the occlusal surface of its respective tooth, and the length of the lateral incline of each of the provided palatal cusps is at least 50% of the width of the occlusal surface of its respective tooth.

5. A set of artificial teeth in which the lower posterior teeth are provided with buccal cusps, but are substantially devoid of lingual cusps, and the upper posterior teeth are provided with palatal cusps and are substantially devoid of buccal cusps, and in which the length of the lateral incline of each of the provided buccal cusps is at least 50% of the width of the occlusal surface of its respective tooth.

6. A set of artificial teeth in which the lower posterior teeth are provided with buccal cusps, but are substantially devoid of lingual cusps, and the upper posterior teeth are provided with palatal cusps and are substantially devoid of buccal cusps, and in which the length of the lateral incline of each of the provided palatal cusps is at least 50% of the width of the occlusal surface of its respective tooth.

7. A set of artificial teeth in which the posterior upper and lower teeth are provided with flat approximately horizontal surfaces at one side of the mesio-distal grooves of the teeth and have cusps at the opposite sides of the grooves, said cusps being provided with laterally inclined faces directed downwardly toward said horizontal surfaces of the respective teeth, said surfaces and faces being arranged to provide lateral, anterior and posterior freedom of movement of the lower teeth relatively to the uppers, while said lower teeth at both sides of the jaw continue to bear on the occlusal surfaces of said upper teeth and while the lower teeth at one side of the jaw remain in the same plane.

8. A set of artificial teeth in which certain of the lower posterior teeth have buccal cusps and are provided at the lingual side of the mesio-distal grooves thereof with approximately horizontal surfaces lying chiefly below said cusps, the upper posterior teeth having palatal cusps and having approximately horizontal surfaces at the buccal sides of the mesio-distal grooves thereof lying chiefly above the plane of the said palatal cusps, both groups of teeth having laterally inclined surfaces approximately connecting the mesio-distal grooves of the respective teeth with high points on the respective cusps of said teeth, and the two groups being so positioned that the inclined surfaces of the upper teeth bear gainst said inclined surfaces of the lower teeth when the two groups of teeth are in a normally centered relationship.

9. A set of artificial teeth in which the lower molars have buccal cusps and are provided with low, approximately horizontal occlusal surfaces instead of the usual mesio-lingual cusps, the upper molars having palatal cusps and approximately horizontal occlusal surfaces opposed to the buccal cusps of the lower molars, said horizontal surfaces of the lower molars being opposed to the palatal cusps of the upper molars.

10. A set of artificial teeth in which the lower molars have buccal cusps and are provided with low, approximately horizontal occlusal surfaces instead of the usual mesio-lingual cusps and have disto-lingual cusps, and the upper molars having mesio-palatal cusps and approximately horizontal occlusal surfaces opposed to the cusps of the lower molars.

11. A set of teeth according to preceding claim 10, in which the palatal cusps of the upper molars are set forward with reference to the disto-lingual cusps of the lower molars to provide a mesial clearance when the two sets of molars are in normal occluded relationship.

12. A set of artificial teeth in which the lower posterior teeth have flat substantially horizontal surfaces in the locations normally occupied by lingual cusps and having buccal cusps inclined upwardly away from said surfaces and the upper posterior teeth have approximately horizontal surfaces in the locations normally occupied by buccal cusps to bear on the buccal cusps of said lower teeth, said upper teeth also having cusps inclined downwardly and laterally away from the horizontal surfaces of their respective teeth and arranged to bear on the horizontal surfaces of said lower teeth, said upper and lower teeth being so spaced that the inclined surfaces of the upper teeth bear on the inclined surfaces of the lower teeth when the teeth are in normally centered relationship, while the lower teeth at either side of the jaw can move laterally on the upper teeth with the cusps of the lower teeth at one side grinding on the flat faces of the upper teeth at the latter side, and the inclined faces of the lower teeth at the opposite side riding on the inclined surfaces of the upper teeth at the latter side, whereby the two sets of teeth are maintained in balance at opposite sides of the jaw during such relative lateral movement of the teeth.

GEORGE P. PHILLIPS.